GUSSETED TYPE BAGS

Original Filed June 28, 1965

GUSSETED TYPE BAGS

Original Filed June 28, 1965 4 Sheets-Sheet 2

GUSSETED TYPE BAGS

Original Filed June 28, 1965 4 Sheets-Sheet 3

GUSSETED TYPE BAGS

Original Filed June 28, 1965 4 Sheets-Sheet 1

United States Patent Office

Re. 28,318
Reissued Jan. 28, 1975

28,318
GUSSETED TYPE BAGS

John J. Goodrich, Pensacola, Fla., assignor to St. Regis Paper Company, New York, N.Y.

Original No. 3,687,356, dated Aug. 29, 1972, Ser. No. 467,416, June 28, 1965, which is a continuation-in-part of abandoned application Ser. No. 169,287, Jan. 29, 1962. Application for reissue Mar. 8, 1974, Ser. No. 449,490

Int. Cl. B65d *31/02*

U.S. Cl. 229—55 4 Claims

Matter enclosed in heavy brackets [ ] appears in the original patent but forms no part of this reissue specification; matter printed in italics indicates the additions made by reissue.

ABSTRACT OF THE DISCLOSURE

A bag of tubular form comprising a plurality of contiguous plies of flexible sheet material, said bag having a front surface and an oppositely disposed rear surface adapted to overlap said front surface at one end of said tube when said bag is in its assembled condition, said bag being longitudinally and reversely creased along diametrically opposed portions to provide a pair of oppositely disposed gussets interposed between said front and rear surfaces, each of said gussets having a front portion and a stepped rear portion adapted to overlap said front portion within the overlap area of said front and rear surfaces at said end of the tube when said bag is in its assembled condition, and with the bag plies extending progressively and successively one beyond another at each surface portion at said bag end, and a bonding agent in a dormant state being applied on each surface portion at said bag end, and said bonding agent being reactivatable to close said bag subsequent to a later bag filling operation.

*This application is a continuation-in-part of my copending application Ser. No. 169,287, filed Jan. 29, 1962, now abandoned.*

The invention pertains to improvements in gusseted bags of the so-called pinch bottom type. Gusseted bags constructed in accordance with the invention may be fabricated from flexible sheet material, such as paper or the like and find wide use in protecting many different types of commodities during transit.

The invention pertains more particularly to a bag of tubular form comprising a plurality of contiguous plies of flexible sheet material wherein the bag has a front surface and an oppositely disposed rear surface which is adapted to overlap the front surface at one end of the tube when the bag is in its assembled condition. The bag is longitudinally and reversely creased along diametrically opposed portions in order to provide a pair of oppositely disposed gussets which are interposed between the front and rear surfaces. Each of the gussets has a front portion and a stepped rear portion which is adapted to overlap the front portion within the overlap area of the front and rear surfaces at the end of the tube when the bag is in its assembled condition.

The invention has as one of its aims, the provision of a new and improved gusseted type bag which has greatly superior closure strength and bonding characteristics as compared to practices of the prior art; and which controls contamination and insect infestation.

The invention provides as another of its aims, a bag closure which is of simple and inexpensive construction and which when completed positively seals the bag mouth against leakage and sifting even though the bags are roughly handled in transit. Such gusseted bag construction is accomplished with a minimum of bag material wastage.

Another feature of the invention resides in the provision of a new and improved gusseted type bag having a heat sealable inner ply of an impervious character which may be heat sealed without having to penetrate all of the plies of the bag with heat, and which is also of superior strength characteristics by means of overlapping the inside ply and thereby obtaining a better bond with additional strength. Such a structure is useful for retaining liquids or gases within or without the bag.

The invention provides as another of its aims, a gusseted type bag of the character aforesaid having a greatly simplified bag which may be simply closed and sealed in the packer's factory without the necessity of applying additional adhesive material and without excessive adhesive flowing over the wrong portions of the package, and which simplifies the handling and filling of the bag by the packer as well as simplifying the opening procedure for the ultimate consumer.

As still another feature of the present invention, a new and improved gusseted type bag is provided which has a more pleasing appearance and fewer wrinkles and which can still maintain a satisfactory marketable package even when there is slight deviation in the fold line as well as deviations in the bonding agent application.

According to one form of the invention the innermost ply of the gusseted type bag is fabricated from a heat sealable material. The rear surface of the innermost ply is cut substantially flush with the stepped rear portion of the other plies and the front surface of the innermost ply is cut substantially flush with the front portion of the other plies at the end of the tube when the bag is in its assembled condition.

The invention may be embodied in bags of single wall or multi-wall construction. As applied to multi-wall bags, further improvements of the invention are obtained by successively stepping the successive plies at the bag ends, and/or by similarly successively stepping the plies in only the gusseted portions of the bag. In this way, upon forming the bag closure by folding over the bag end and adherently bonding against one of the bag surfaces, all of the bag plies participate and contribute to the bonding action.

In accordance with a further aspect of the invention, a bonding agent in a dormant state is applied to the surfaces of the gusset portions as well as the front and rear surfaces at the end of the tube when the bag is in its assembled condition. The bonding agent is such that it may be reactivated to close the bag subsequent to a later bag filling operation. Further, in a modified form of the invention the bonding agent may be applied in transverse spaced strips on the face of the steps at the end of the tube. In still another form of the invention, the bonding agent is applied adjacent the upper edges of the steps so that portions of the gusset may be adhered to the rear surface of the tube. This is particularly advantageous since it eliminates the necessity for manually tucking in the gussets or corners of the bag, which would otherwise be required after the filling operation.

As another aspect of the invention the longitudinal width of the rear gusset exposed surfaces may be substantially less than the width of the rear wall exposed surface or the front gusset exposed surfaces.

Still another aspect of the present invention resides in the provision of a new and improved gusseted type bag having a free floating polyethylene inside ply. This provides a moisture and air impervious inner ply which may expand or contract without encountering adverse tension or compression forces normally accompanying interbonded plies.

Also, according to the present invention a thumb notch may be provided in the outside ply of the front surface adjacent the top edge of the rear surface when the rear surface is folded over and adhered to the front surface.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention. Several embodiments of the invention have been chosen for purposes of illustration and description, and are shown in the accompanying drawings, forming a part of the specification, wherein:

Figure 1:
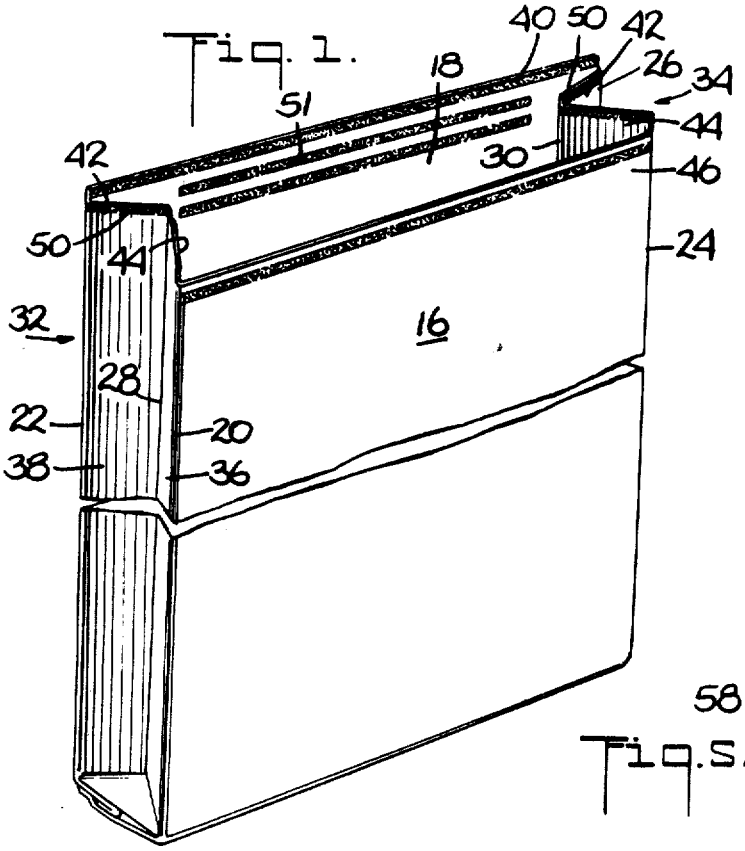
FIG. 1 is a perspective view of a gusseted type pinch bottom bag constructed in accordance with the invention.
Figure 2:
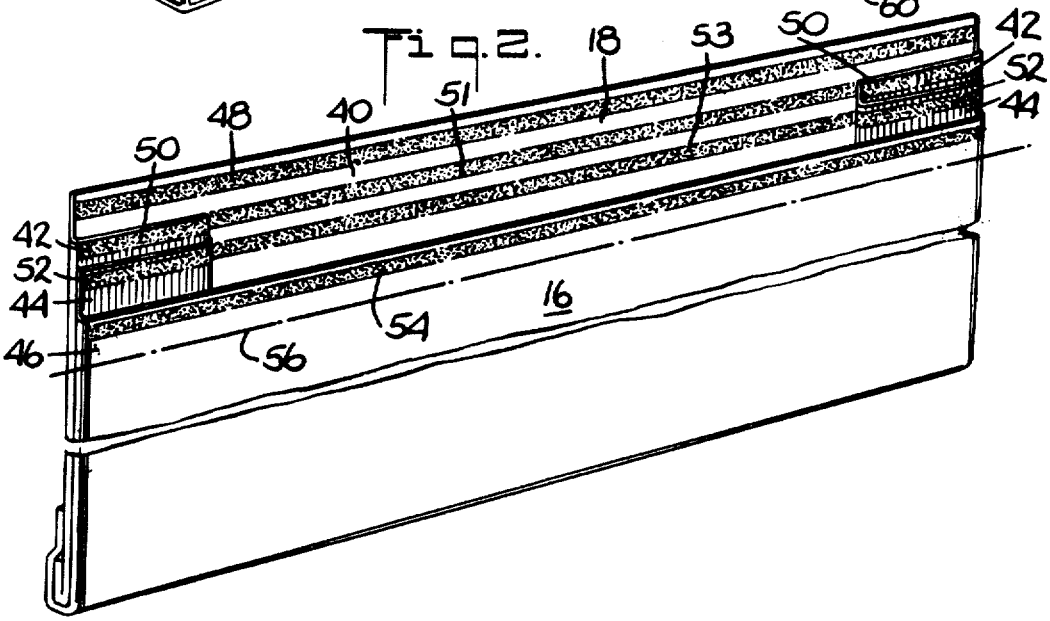
FIG. 2 is an enlarged perspective view showing details of the closure structure according to one form of the invention.
Figure 3:
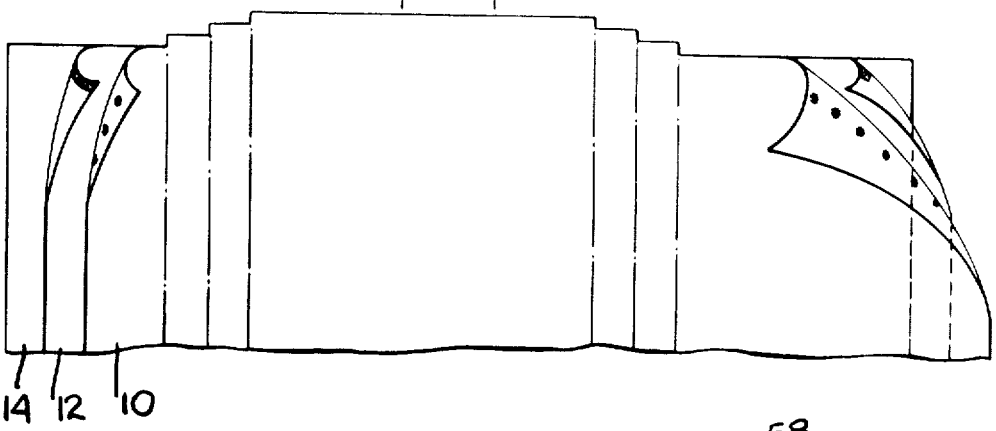
FIG. 3 is a plan view of a blank of flexible sheet material for fabrication into a multi-ply or multi-wall bag.

In the embodiment of the invention illustrated in FIGS. 1-3, the gusseted type bag is formed from a single ply 10, FIG. 1, or a plurality of contiguous plies including plies 10, 12 and 14, FIG. 3, of flexible sheet material, such as kraft or other paper. The innermost ply may have a thin plastic coating of polyethylene or the like, applied to one or both surfaces thereof for moisture proofing. Preferably when a plurality of plies are used, the plies 10, 12 and 14 are longitudinally stepped as indicated in FIG. 3 so that when the blank is formed into a tubular member the joining of the respective longitudinal edges of each ply will be staggered. It is noted that only one end of the bag or tubular structure is shown, however, it is understood that the other end of the bag is constructed in a like complimentary stepped manner.

As best seen in FIGS. 1 and 2, the bag has a front wall surface 16 and an oppositely disposed rear wall surface 18 adapted to overlap or extend above the front surface at one end of the tube when the bag is in its assembled condition. Referring to FIG. 1, the bag is longitudinally creased along fold lines 20, 22, 24 and 26, and further, the bag is longitudinally and reversely creased along diametrically opposed lines 28 and 30, thereby forming a pair of oppositely disposed gussets indicated generally at 32 and 34 which are interposed between the front and rear walls or surfaces 16 and 18.

Each of the gussets 32 and 34 have a front portion 36 and a stepped rear portion 38, as seen in FIG. 1. The rear portion 38 is adapted to overlap the front portion 36 within the overlapped area of the front and rear wall surfaces 16 and 18, thereby forming a rear wall exposed surface 40, rear gusset exposed surfaces 42, front gusset exposed surfaces 44, and a front wall exposed surface 46.

Still referring to FIGS. 1 and 2, there is shown a plurality of spaced transversely extending strips of a bonding agent in a dormant state. The bonding agent is a preapplied type of thermoplastic resin adhesive of any suitable type. While such adhesive could be applied to substantially cover all of the exposed surfaces at the end of the bag, it is preferable that it be applied in horizontally, transversely disposed, spaced strips. As seen in FIGS. 1 and 2, a first strip 48 is applied on the rear wall exposed surface 40 and extends substantially across the width of the bag. A second strip 50 extends across the rear gusset exposed surfaces 42 and preferably across the adjacent portion of the rear wall exposed surface as at 51. Next, a third strip 52 extends across the front gusset exposed surfaces 44 and preferably across the adjacent portion 53 of the rear wall exposed surface as at 53, and a fourth strip of bonding agent 54 is applied to the front wall exposed surface 46. When packaging certain materials, the strip of bonding agent 54 may be dispensed with, but when packaging other commodities the bonding agent strip 54 serves a very important function. That is, the latter strip serves to make the bag contamination or insect proof, otherwise there is the possibility that insects may penetrate through the corners of the bag thereby gaining access to the interior thereof. Moreover, the strip of bonding agent 54 serves as an added measure of protection in the event that the application apparatus of the strips of bonding agent 48, 50 and 52 misfires or skips a spot, the package would nevertheless be satisfactorily sealed.

Figure 6:
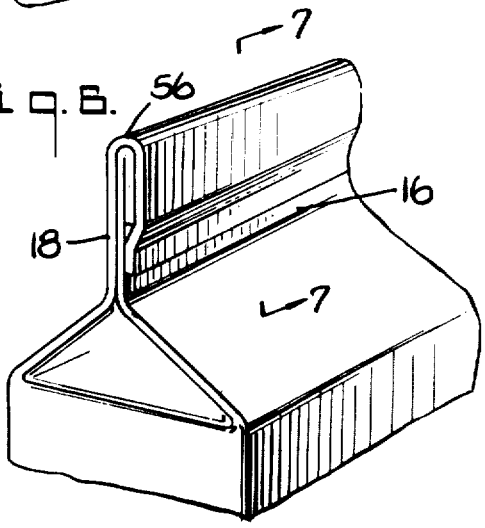
FIG. 6 is a fragmentary perspective view showing the closure portion of a gusseted type bag according to the invention after the exposed surfaces have been folded over in bonded condition.
Figure 7:
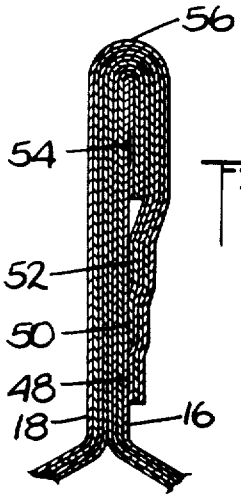
FIG. 7 is a longitudinal sectional view taken along the line indicated at 7—7 in FIG. 6 and showing details of the bonding between the exposed surfaces and the face of the front wall of the bag.

As best seen in FIGS. 6 and 7, closure of the package is accomplished by folding the end along the fold crease 56, thus to adhere the bag end to the outer ply of the front surface 16. As seen in FIG. 7, each of the adhesive strips 48, 50, 52 and 54 are in direct contact with the front surface. This is why applicant's bag is of substantially superior strength as compared to bags of the prior art.

Normally the bags are shipped to the packers in the condition as shown in FIG. 2 with the bonding medium already applied. The packer opens the top of the bag and inserts a filling spout therein for filling the bag with a desired commodity. Thereafter, the operators tuck-in the gusset portions and fold over the end of the bag along crease line 56, FIG. 2. Normally heat and pressure are applied to reactivate the preapplied bonding agent to thereby permanently close the bag. This may be accomplished by means of hot pressure bars or hot rollers, as desired. Also, with certain types of bonding agents, a hot air blast may be employed to reactivate the bonding agent, or in still other instances the bonding agent may require chemical reactivation. It will be appreciated that with the aforementioned type of preapplied bonding agent, the packer is not troubled with the problem of applying adhesive to the bag in his plant. This may be particularly desirable when packaging comestibles wherein adhesive may accidentally become intermingled with the contents of the package.

Figure 5:
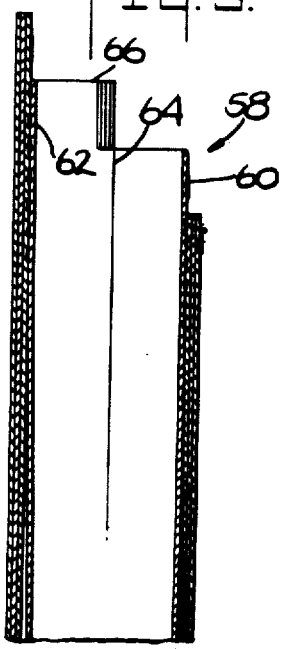
FIG. 5 is a longitudinal sectional view taken substantially along the lines indicated at 5—5 in FIG. 4.
Figure 4:
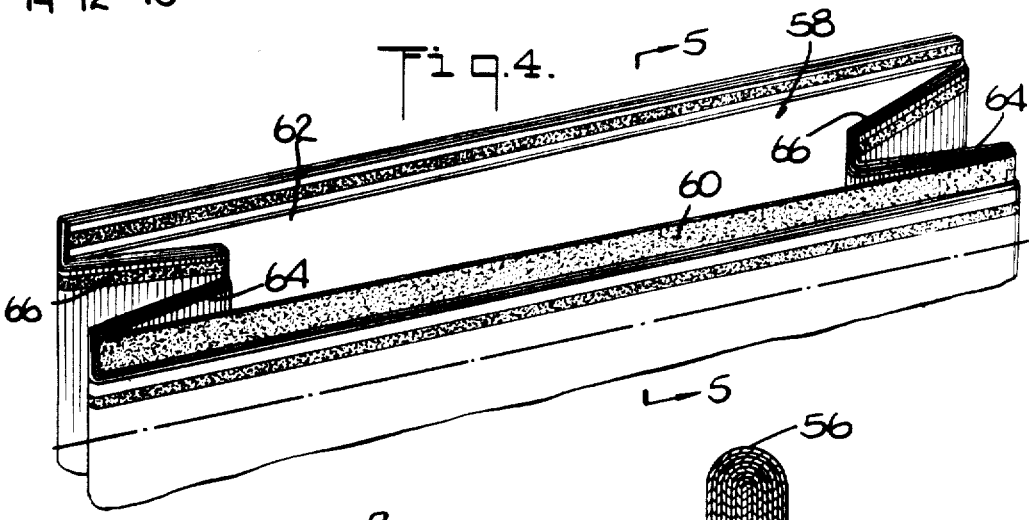
FIG. 4 is a fragmentary perspective view showing the closure portion of a gusseted type bag according to a modified form of the invention.

Referring to FIGS. 4 and 5, the innermost ply designated generally at 58 has a front wall exposed surface 60 which extends beyond the other front wall plies and a rear wall exposed surface 62 which extends below the other rear wall plies. Preferably the front surface 60 is substantially flush with the front gusset exposed surfaces 64, and the rear wall exposed surface 62 is flush with the rear gusset surfaces 66. The innermost ply 58 is fabricated from heat seal material, and accordingly, the exposed surfaces thereof may be subjected to heat and thereby sealed without the necessity of the heat passing through as many plies as would be necessary if the inner ply was of the same relative height as the outer plies. Further, the inner ply 58 may be fabricated from many different types of materials porous and non-porous. For example, such materials include polyolefines such as polyethylene and polypropylene, polyamides such as nylon and polyesters such as polyalkylene derivatives of polycarboxylic acids especially polyethylene terephthalate. Further, the inner ply may be fabricated into a tubular member in a suitable manner such as that disclosed in U.S. Pat. No. 3,399,096, issued on Aug. 27, 1968.

Figure 5A:
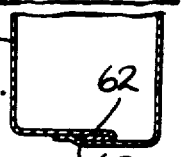
FIG. 5a is a fragmentary view showing overlapping closure means of the innermost ply.

If the inner ply 58 is thermoplastic coated then, as best seen in FIG. 5a, the rear wall 62 of the inner ply 58 may be doubled over upon itself and the front wall surface 60 overlapped thereover in order to form a hermetic seal between the two thermoplastic surfaces.

Figure 8:
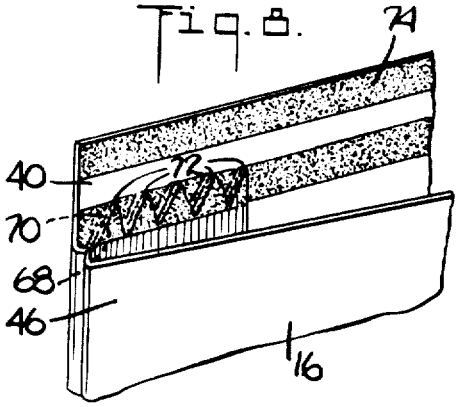
FIG. 8 is a fragmentary perspective view showing a modified form of gusset structure when the bag tube is in its flattened condition.
Figure 9:
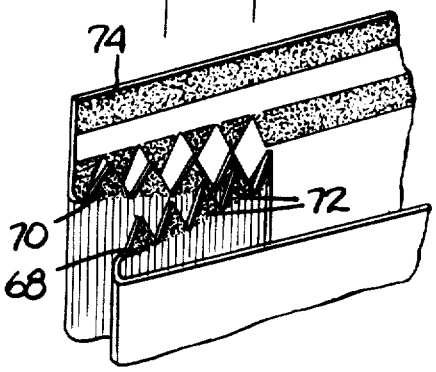
FIG. 9 is a fragmentary perspective view similar to FIG. 8, but showing the gusset structure after the package has been partially opened.

Referring to FIGS. 8 and 9, there is illustrated a modified form of gusset construction. In this form a front gusset surface 68 and a rear gusset surface 70 are cut to substantially the same height or flush, and both are disposed with the overlapped area of the rear wall exposed surface 40 and the front wall exposed surface 46. Further, according to this form of the invention, the top edge of the front and rear gusset exposed surfaces 68 and 70 are serrated or are provided with diamond or round notching as indicated at 72. The first transverse strip of bonding agent 74 is applied across the rear wall exposed surface 40, and a second transverse strip of bonding agent is applied across the top edge of the gussets including the serrated edge portion 72, thereby adhering both the front and back gussets 68 and 70 to the rear wall 40 at the top of the bag. This has the advantage of preventing leakage of packaging material at the outer extremities of the gussets, and also facilitates closure of the bag after filling with packaging material since it eliminates the necessity for manually tucking in the corners of the gussets which would otherwise be required.

Figure 10:
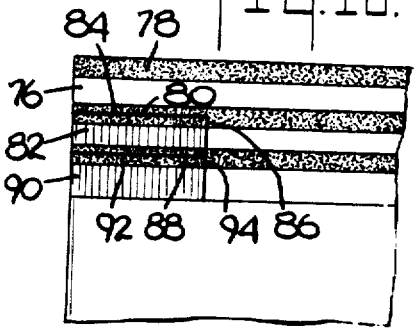
FIG. 10 is a fragmentary elevation showing another modified form of gusset construction according to the invention.

Referring to FIG. 10, there is illustrated a modified form of gusset arrangement wherein three strips of pre-applied bonding agent in a dormant state are applied to the rear wall exposed surface, to the rear gusset exposed surfaces and to the front gusset exposed surfaces respectively. That is, one strip of bonding agent 78 is applied transversely of the bag across the rear wall exposed surface 76; a second strip 80 of bonding agent is applied to the upper edge of the rear gusset exposed surface 82 so that a portion of the bonding agent appears on the top edge of the rear gusset exposed surface 82 and a portion of the bonding agent appears on the adjacent portion of the rear wall exposed surface 76, thereby bonding the two surfaces together along the line 84 as well as along the line 86; and a third strip 88 of bonding agent is applied along the top edge of the front gusset exposed surface 90 in an overlapping manner as seen in FIG. 10 so that the front gusset exposed surface 90 is bonded to the rear gusset exposed surface 82 along the line 92 and the front gusset surface 90 is also bonded to the rear wall exposed surface 76 along the line 94. As pointed out above, bonding of the gussets one to the other and to the rear wall serves to prevent leakage of the packaging material at the extremities of gussets and facilitates closure of the bag after filling with packaging material.

Figure 11:
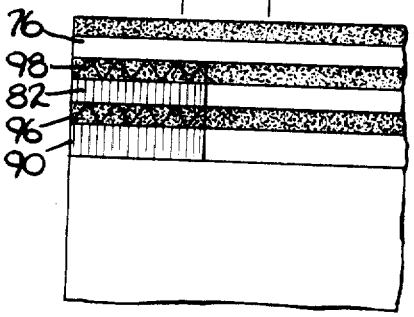
FIG. 11 is a fragmentary elevation illustrating still another form of closure means according to the invention, wherein portions of the gussets are adhered to the rear surface.

Referring next to FIG. 11, there is illustrated a further modification of the invention. According to this embodiment, the front gusset exposed surface is stepped below the rear gusset exposed surface and the upper edges of both gusset surfaces are provided with a serrated or saw tooth type contoured edge as indicated at 96 and 98, respectively. This construction provides a longer effective linear edge for providing better bonding characteristics between the front gusset 90 and the rear gusset 82 as well as the rear gusset 82 and the rear wall exposed surface 76.

Figure 12:
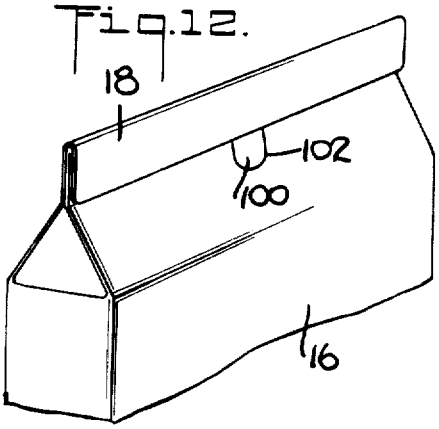
FIG. 12 is a perspective view of a gusseted type bag showing the thumb notch opening means.
Figure 13:
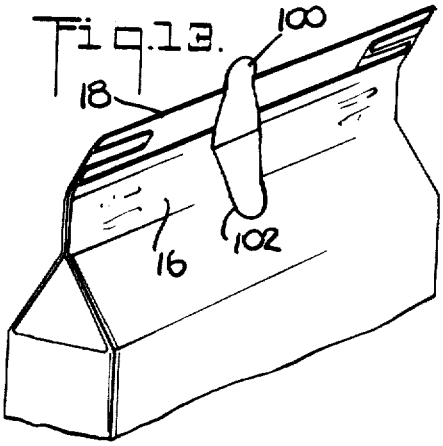
FIG. 13 is a perspective view similar to FIG. 12, but illustrating the operation of the thumb notch opening means.

Referring to FIGS. 12 and 13, there is shown new and improved means for opening a gusseted type bag. A thumb notch 100 is formed in the outermost ply of a multi-ply bag by an interrupted line of slit 102 therein disposed adacent the top edge of the rear wall 18 when the rear wall is folded over in sealed condition. Since the aforementioned strips of adhesive material are adhered to the outermost ply of the front wall 16, the thumb notch 100 tends to rip the outermost ply of the front wall 16 underneath the folded over portion of the back wall 18, and thereby provides a thumb grip to grasp the so-folded over back wall that it can be easily lifted to open the bag as shown in FIG. 13.

Figure 14:
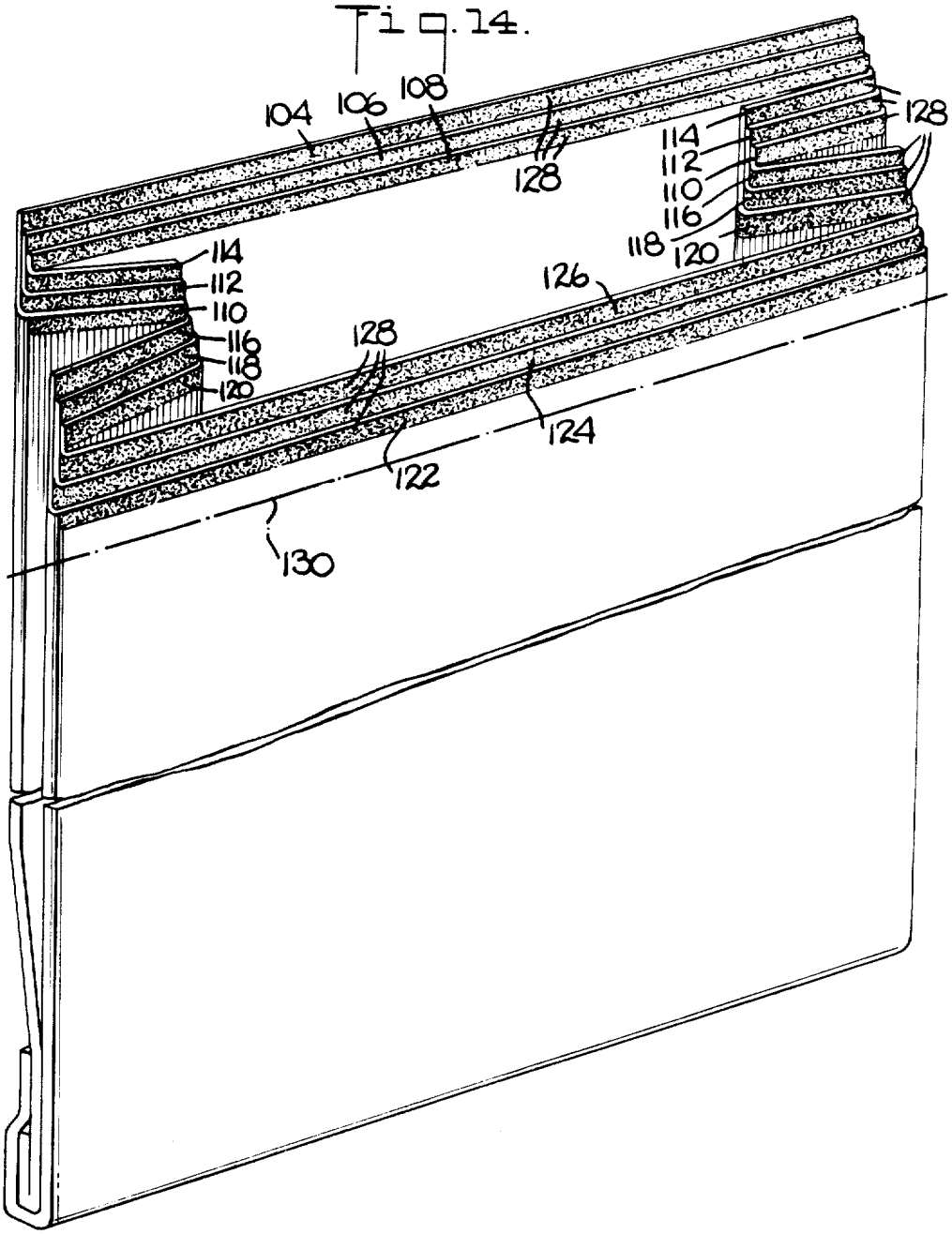
FIG. 14 is a perspective view of a modified form of the invention showing a multi-wall bag construction wherein the bag plies are successively stepped at the bag ends.

Referring to the multi-wall bag constructions, the bag plies may be successively stepped at the bag ends to provide additional adherence on forming the bag closure. Thus, referring to FIG. 14, the rear wall exposed surface comprises a plurality of plies which may, for example, include three plies including an outside ply 104, a second ply 106 and an inside ply 108. The rear gusset exposed surfaces include an outside or first ply 110, a second ply 112 and an inside or third ply 114. The front gusset exposed surfaces include plies 116, 118 and 120. The front wall exposed surface includes a first ply 122, a second ply 124 and a third ply or inside ply 126. It will be appreciated that each of the plies in each of the exposed surfaces has a bonding agent in a dormant state applied thereto as at 128, FIG. 14. The bonding agent is reactivatable to permanently close the bag subsequent to a later bag filling operation. In this way, portions of all the bag plies in all surfaces including the gusset areas, upon forming the bag closure by folding over along the fold line 130 and reactivating the bonding agent, are adherently bonded to the bag surface.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A bag of tubular form comprising a plurality of contiguous plies of flexible sheet material, said bag having a front surface and an oppositely disposed rear surface adapted to overlap said front surface at one end of said tube when said bag is in its assembled condition, said bag being longitudinally and reversely creased along diametrically opposed portions to provide a pair of oppositely disposed gussets interposed between said front and rear surfaces, each of said gussets having a front portion and a stepped rear portion adapted to overlap said front surface within the overlap area of said front and rear surfaces at said end of the tube when said bag is in its assembled condition, and with the bag plies extending progressively and successively one beyond another at each surface portion and each gusset portion at said bag end, and a bonding agent in a dormant state being applied on each surface portion and each gusset portion at said bag end, and said bonding agent being reactivatable to close said bag subsequent to a later bag filling operation.

2 A bag of tubular form comprising a plurality of contiguous plies of flexible sheet material, said bag having a front surface and an oppositely disposed rear surface adapted to overlap said front surface at one end of said tube when said bag is in its assembled condition, said bag being longitudinally and reversely creased along diametrically opposed portions to provide a pair of oppositely disposed gussets interposed between said front and rear surfaces, each of said gussets having a front portion and a stepped rear portion adapted to overlap said front surface within the overlap area of said front and rear surfaces at said end of the tube when said bag is in its assembled and successively one beyond another at each surface portion and each gusset portion at said bag end, and a bonding agent in a dormant state being applied on each surface portion and each gusset portion at said bag end, and said bonding agent being reactivatable to close said bag subsequent to a later bag filling operation, the opposite end of said bag being the reverse of and complementary to that of said one end, the overlap portion thereof being folded over and adhered to the rear surface of said bag to close said bag end, the innermost ply having bonded thereto a coating layer of a heat sealable thermoplastic material, and the opposed surfaces of said layer being heat sealed together adjacent said closed bag end.

3 A bag of tubular form comprising a plurality of contiguous plies of flexible sheet material, said bag having a front surface and an oppositely disposed rear surface adapted to overlap said front surface at one end of said tube when said bag is in its assembled condition, said bag being longitudinally and reversely creased along diametrically opposed portions to provide a pair of oppositely disposed gussets interposed between said front and rear surfaces, each of said gussets having a front portion and a stepped rear portion adapted to overlap said front surface within the overlap area of said front and rear surfaces at said end of the tube when said bag is in its assembled condition, and with the bag plies extending progessively and successively one beyond another at each surface portion and each gusset portion at said bag end, and a bonding agent is a dormant state being applied on each surface portion and each qusset portion at said bag end, and said bonding agent being reactivatable to close said bag subsequent to a later bag filling operation, and said bag plies being composed of paper and said innermost paper ply having bonded thereto a moisture impervious coating layer.

4 A bag of tubular form comprising a plurality of contiguous plies of flexible sheet material, said bag having a front surface and an oppositely disposed rear surface adapted to overlap said front surface at one end of said tube when said bag is in its assembled condition, said bag being longitudinally and reversely creased along diametrically opposed portions to provide a pair of oppositely disposed gussets interposed between said front and rear surfaces, each of said gussets having a front portion and a stepped rear portion adapted to overlap said front surface within the overlap area of said front and rear surfaces at said end of the tube when said bag is in its assembled condition, and with the bag plies extending progressively and successively one beyond another at each surface portion and each gusset portion at said bag end, and a bonding agent in a dormant state being applied on each surface portion and each gusset portion at said bag end, and said bonding agent being reactivatable to close said bag subsequent to a later bag filling operation, the innermost ply of said bag being composed of a heat sealable thermoplastic material and the remaining plies being made of paper, opposed portions of said plastic ply being heat sealed together transversely of said bag at a closed end thereof

References Cited

The following references, cited by the Examiner, are of record in the patented file of this patent or the original patent

UNITED STATES PATENTS

| | | | |
|---|---|---|---|
| 3,650,460 | 3/1972 | Lokey | 229—55 |
| 2,875,944 | 3/1959 | Duffin | 229—55 |
| 2,278,502 | 4/1942 | Waters | 229—3.5 R |
| 2,925,171 | 2/1960 | Eaton | 229—48 T |
| 3,203,620 | 8/1965 | Becker | 229—57 |
| 2,871,771 | 2/1959 | Mercer | 93—35 R |
| 426,607 | 4/1890 | Single | 229—58 |
| 3,203,323 | 8/1965 | Adams | 93—35 R |
| 2,582,286 | 1/1952 | Schenck | 229—62 |
| 2,975,955 | 3/1961 | McCurry | 229—55 |

FOREIGN PATENTS

| | | | |
|---|---|---|---|
| 1,366,379 | 6/1964 | France | 229—55 |
| 288,177 | 3/1965 | Netherlands | 229—55 |

WILLIAM I. PRICE, Primary Examiner

S. P GARBE, Assistant Examiner

U.S. Cl. X.R.

229—58, 62

UNITED STATES PATENT AND TRADEMARK OFFICE

CERTIFICATE OF CORRECTION

PATENT NO. : Re. 28,318

DATED : Jan. 28, 1975

INVENTOR(S) : J. J. Goodrich

It is certified that error appears in the above-identified patent and that said Letters Patent are hereby corrected as shown below:

Column 7, after line 12, insert --condition, and with the bag plies extending progressively--

Column 7, line 41, delete "is" and substitute --in--

Column 7, line 42, delete "qusset" and substitute --gusset--

Column 7, line 44, delete "and"

Signed and Sealed this thirteenth Day of April 1976

[SEAL]

*Attest:*

RUTH C. MASON
*Attesting Officer*

C. MARSHALL DANN
*Commissioner of Patents and Trademarks*

Dedication

Reissue No. 28,318.—*John J. Goodrich*, Pensacola, Fla. GUSSETED TYPE BAGS. Patent dated Jan. 28, 1975. Dedication filed May 8, 1978, by the assignee, *St. Regis Paper Company*.

Hereby dedicates to the Public the remaining term of said patent.

[*Official Gazette June 27, 1978.*]